United States Patent [19]
Cowen

[11] 3,789,443
[45] Feb. 5, 1974

[54] HONEYCOMB DECAPPING AND HONEY EXTRACTING APPARATUS

[76] Inventor: John F. Cowen, P.O. Box 206, Parowan, Utah 84761

[22] Filed: July 28, 1972

[21] Appl. No.: 276,047

[52] U.S. Cl. .................................................. 6/12 A
[51] Int. Cl. ............................................ A01k 51/00
[58] Field of Search .................................... 6/12 A

[56] References Cited
UNITED STATES PATENTS
3,535,721  10/1970  Bell, Jr. ............................... 6/12 A

*Primary Examiner*—Louis G. Mancene
*Assistant Examiner*—J. Q. Lever
*Attorney, Agent, or Firm*—Herschel C. Omohundro

[57] ABSTRACT

In general this apparatus includes means for removing the wax caps from honeycombs, moving the decapped combs from the decapping means into apparatus for extracting the honey from the decapped combs and moving the empty combs from the extracting apparatus for cleaning, if necessary, and replacement in the hives. More specifically, the apparatus has a plurality of extracting units disposed in side-by-side relation, each unit having a cylindrical casing with a rotatable reel inside. The reel has guide tracks for receiving and holding decapped combs while rotative movement is imparted to the reel to centrifuge the honey from the combs. Drive means serve to alternately rotate the reels, and while each reel is stationary a decapping device is registered with a loading station of the extractor and operated to decap the combs and load them onto the stationary reel. The loading operation also serves to unload the empty combs onto a conveyor holder from which they can be removed for transportation to and replacement in the hives. The apparatus is semiautomatic in operation, the filled combs being manually loaded into the decapping device, which is manually moved from one extractor unit to another, and the empty combs are manually unloaded from the conveyor holder.

20 Claims, 8 Drawing Figures

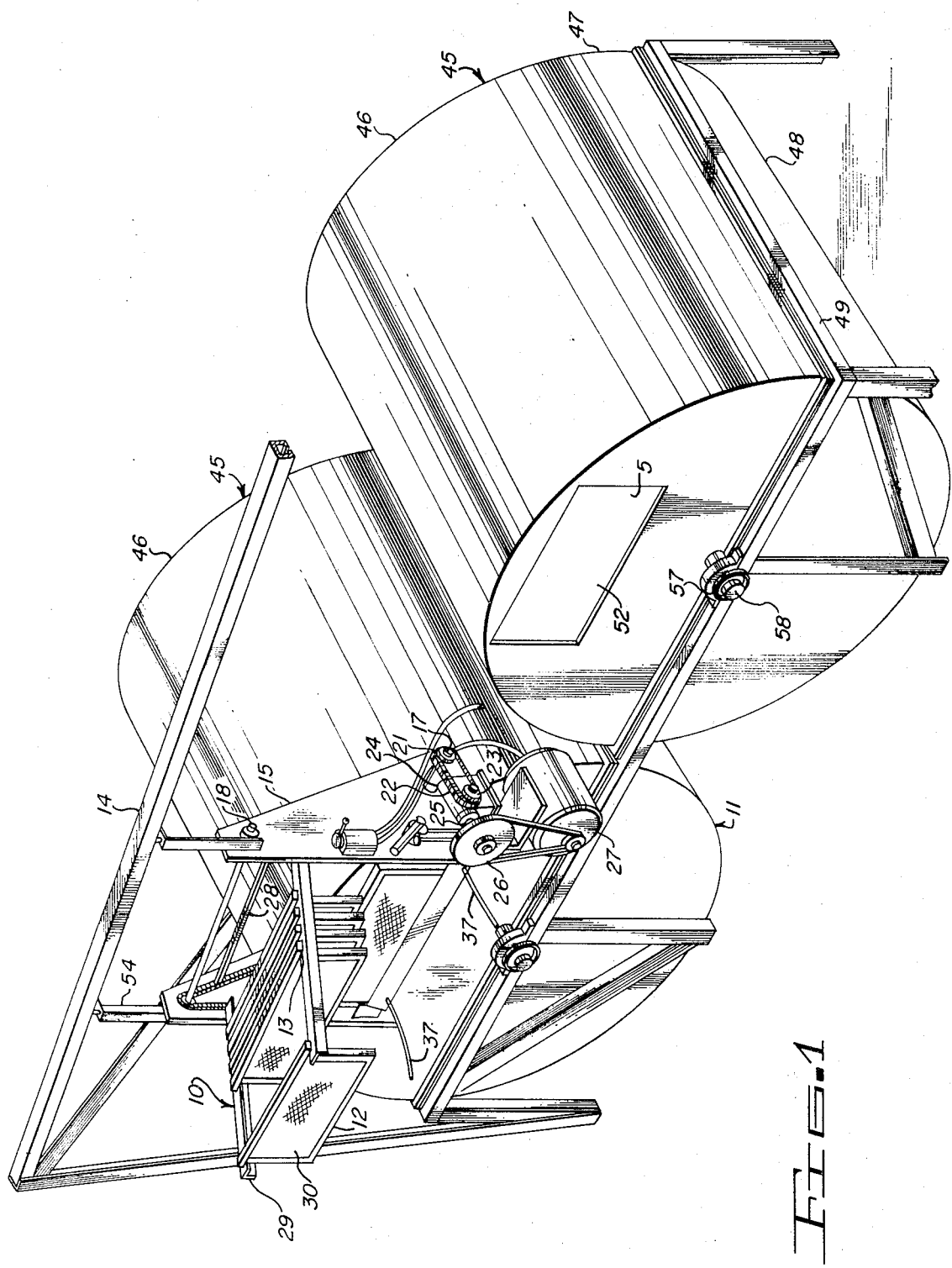

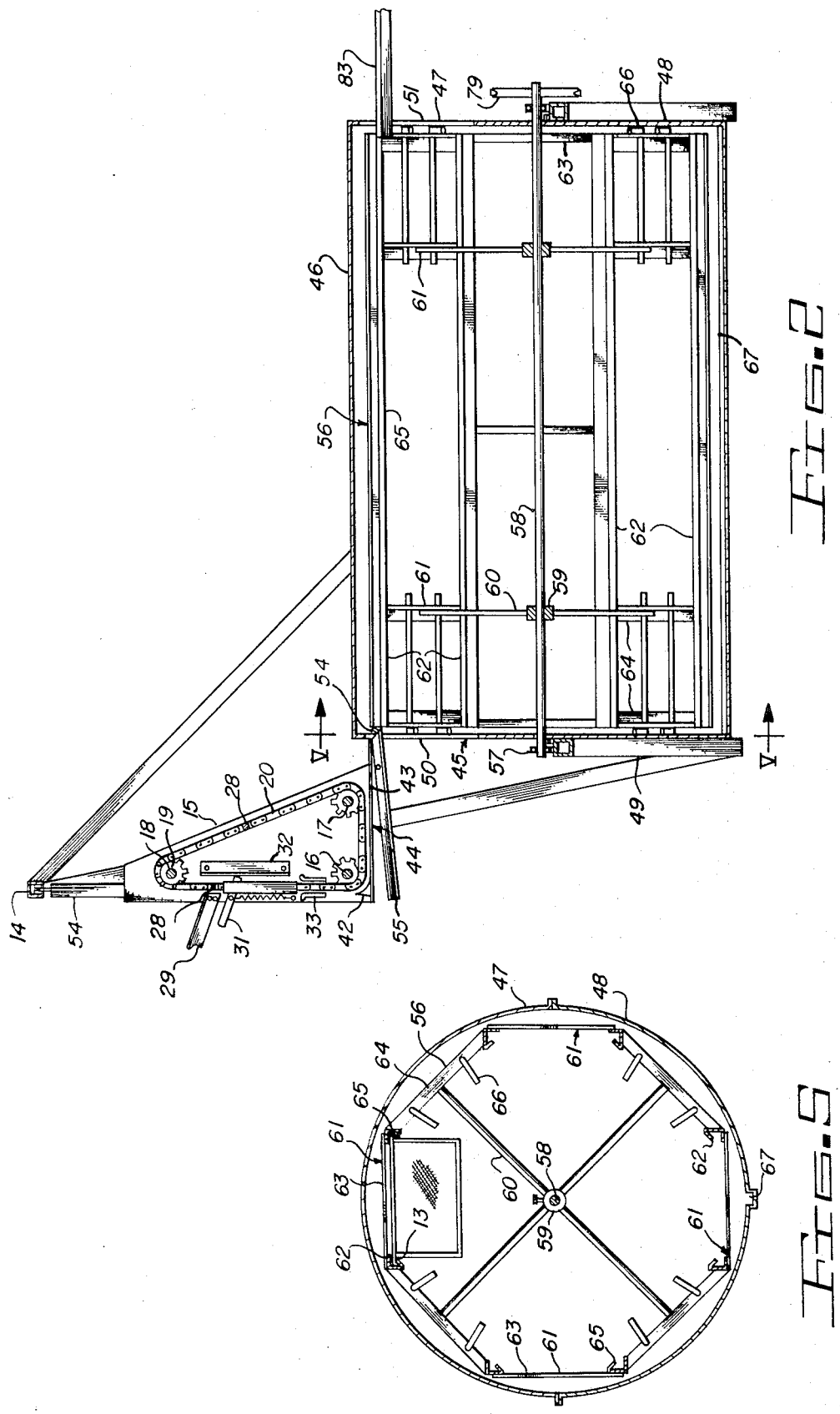

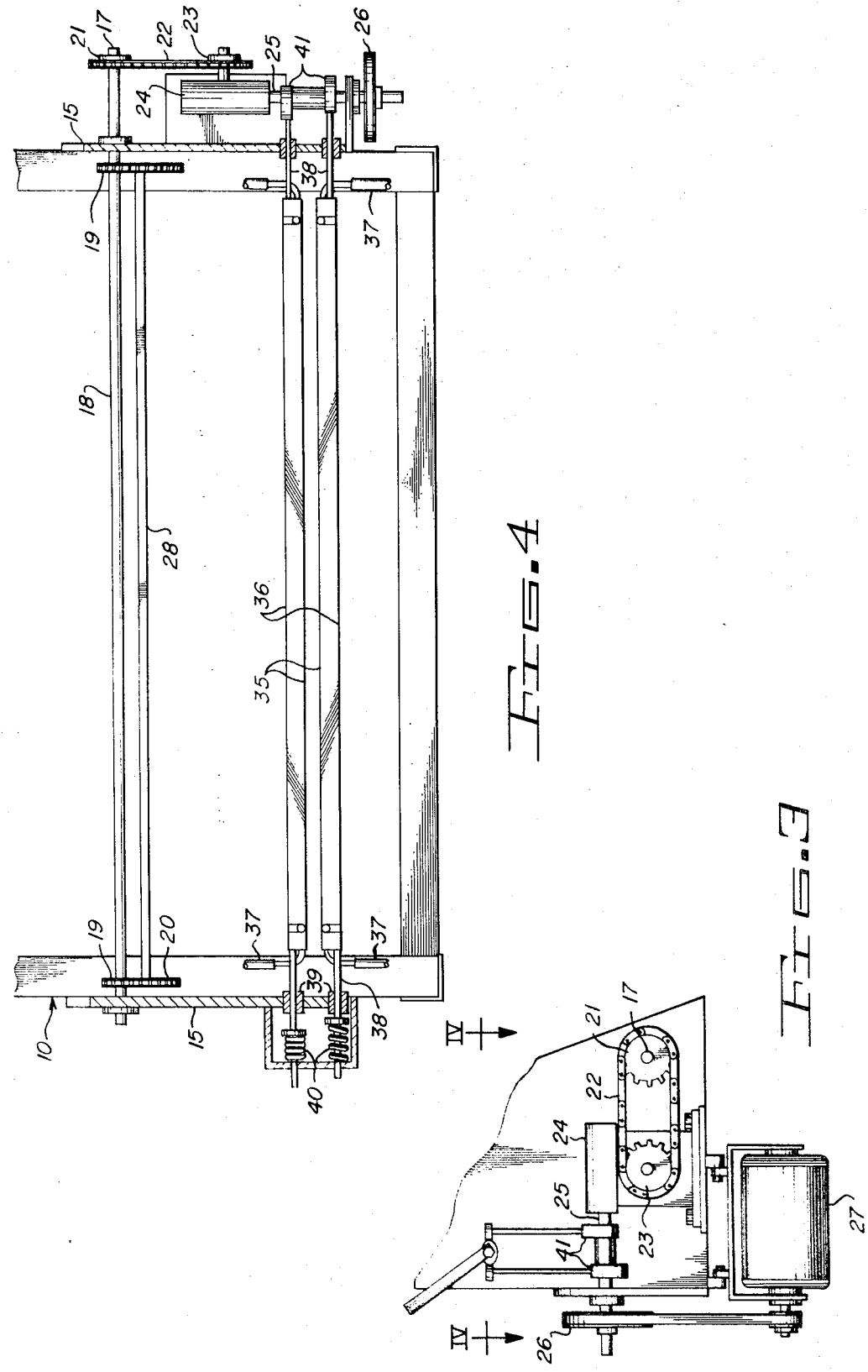

HONEYCOMB DECAPPING AND HONEY EXTRACTING APPARATUS

SUMMARY

This invention relates generally to bee keeping and the production of honey, and more specifically to providing apparatus which is useful in removing the honey after the bees have accumulated and stored it in the hives. Still more specifically, the invention relates to the removal of the wax capping applied to the cells in a honeycomb and the extraction of the honey from the decapped combs.

One of the primary objects of this invention is to provide apparatus which is semiautomatic in operation and relatively simple in construction so that it will be comparatively inexpensive, thus suitable for acquisition and use by the small operators.

Another object of the invention is to provide a simple unit for extracting honey which may be used in combination with honeycomb decapping apparatus of the type shown and described in my U.S. Pat. No. 3,609,780, issued Oct. 5, 1971, a plurality of extracting units being combined with a single comb decapper whereby one or not in excess of two operators can most efficiently service a predetermined number of hives.

Another object of the invention is to provide a honey extracting unit having a rotatable reel on which a relatively large group of decapped honeycombs can be held while the reel is rotated at a rate sufficient to centrifuge the honey from the combs, a casing being provided around the reel to collect the honey and conduct it to an outlet.

Still another object of this invention is to provide at least two of the units mentioned in the preceding paragraph in side-by-side relationship and dispose a comb decapping device, of the type shown in my patent referred to previously, for movement between positions to load each of the units, one unit being loaded with decapped combs while the reel of the other unit previously loaded is being rotated or spun to centrifuge the honey from the combs held therein.

A further object of the invention is to provide the combination mentioned in the preceding paragraph with a novel drive means which is characterized by its simplicity, a motor driven variable speed transmission with drive pulleys being mounted for rocking movement, a driven pulley being connected with each reel and registering with a drive pulley, an endless belt extending around each driven pulley and the corresponding drive pulley, and actuating means for rocking the transmission to alternately establish a driving relation between a drive and driven pulley to spin the selected reel.

An object also of the invention is to provide the combination mentioned in the two preceding paragraphs with brake means for reducing the speed of the spinning reel and stopping it in selected loading positions.

Other objects and advantages will be apparent from a perusal of the following description of one form of the invention selected for illustration in detail in the accompanying drawings.

IN THE DRAWINGS

FIG. 1 is a perspective view of Honeycomb Decapping and Honey Extracting Apparatus formed in accordance with the present invention;

FIG. 2 is a vertical sectional view taken through the apparatus, the plane of the section being on the axis of one unit of the honey extracting means with a comb decapping device in the loading position;

FIG. 3 is a fragmentary end elevational view of a portion of the comb decapping device;

FIG. 4 is a horizontal sectional view taken through the comb decapping device on the plane indicated by the line IV—IV of FIG. 3;

FIG. 5 is a transverse sectional view taken through one unit of the honey extracting means on the plane indicated by the line V—V of FIG. 2;

DESCRIPTION

Figure 6:
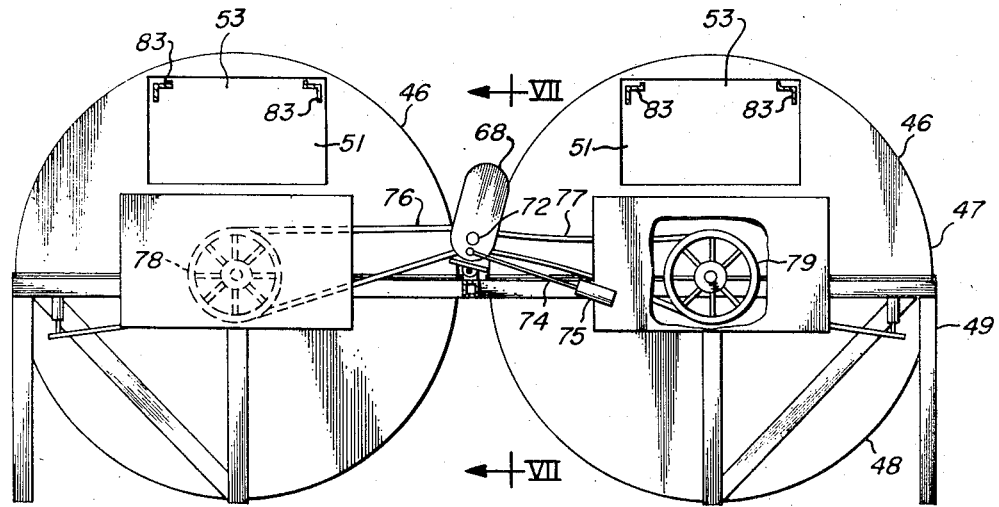
FIG. 6 is an elevational view of the back end of the apparatus illustrating more particularly the driving means for the honey extracting apparatus.
Figure 7:
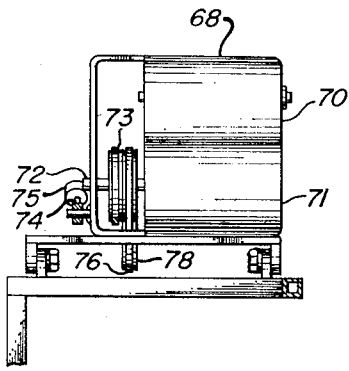
FIG. 7 is a vertical sectional view taken through the driving means on the plane indicated by the line VII—VII of FIG. 6.
Figure 8:
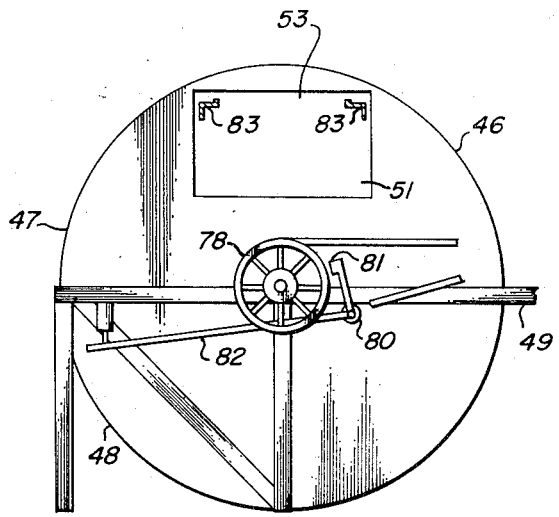
FIG. 8 is a detailed elevational view showing a braking means used to stop and hold stationary a reel in the honey extracting apparatus.

More particular reference to the drawings will disclose that the Honeycomb Decapping and Honey Extracting Apparatus of the invention generally includes two major parts. The first part comprises a honeycomb decapping device 10 and the second major part is a honey extracting apparatus 11.

The honeycomb decapping device 10 may be of various suitable types, the one preferred being that shown in my U.S. Pat. No. 3,609,780 dated Oct. 5, 1971, to which reference may be made for a detailed description, the illustration and description included herein being only that necessary for a complete understanding of the present combination. As pointed out in the objects, the honeycomb decapping device is designed to receive the filled honeycombs as they come from the hives, pass them between a pair of heated reciprocating knives to decap the cells, and move the decapped combs into the extracting apparatus 11. Personnel familiar with bee keeping and honey production are aware that commercial honeycombs comprise rectangular open wood frames 12, the ends of the top bar of which project slightly beyond the end bars of the frame to provide lugs 13. These lugs support the combs in the hive and are also used to support the combs in the decapping and extracting apparatus of the invention.

As shown in FIGS. 1 and 2, the decapping device is suspended from an overhead rail 14 for movement between positions for loading decapped combs into one or the other of two extracting units making up the apparatus 11. In general, the decapping device 10 has spaced side frames 15 which rotatably support a plurality of transversely extending shafts 16, 17 and 18. Adjacent their ends at the inner sides of the frames 15 the shafts 16, 17 and 18 are equipped with sprockets 19 around which are trained endless chains 20. The shafts 16 and 17 with their sprockets are arranged near the front and rear of the lower ends of the frames 15 to provide horizontal strands of chains, while shaft 18 is adjacent the upper ends of the frames to provide vertically downwardly moving operating strands at the front of the frames and upwardly moving return strands at the rear thereof. As shown in FIGS. 1 and 3, shaft 17 extends beyond the frame 15 at the right side and is equipped with another sprocket 21 to receive a drive chain 22 also trained around an output sprocket 23 provided on a transmission 24. This transmission has an input shaft 25 and pulley 26 by which power is transmitted to the decapper from a motor 27. Since the sprockets 19 are fixed to the shafts and the chains extend around and mesh with the sprocket teeth the chains will move at the same speed. Suitable means may be provided to vary such speed as desired.

FIGS. 1 and 2 show that bars 28 extend between the chains at predetermined spaced intervals. These bars serve to move the honeycombs during the operations of decapping and loading them into the honey extracting apparatus. The decapping device is provided at the front with an automatic feeder 29 onto which the filled combs 30 are manually placed. The feeder then feeds them one at a time into the decapper. As it is fed into the decapper, each honeycomb is resiliently held by a spring-pressed pivoted strip 31 between the moving chains until one of the bars 28 engages the top of the honeycomb and moves it downwardly. Suitable guide members 32 at the back of the vertical strands of chain steady the honeycomb until it is engaged by the bar 28. As the honeycomb is moved downwardly, the lower portion is centered by guides 33 at the front and rear sides of the chains. At this time also feeler extensions 34 which are disposed at the ends and project upwardly beyond the decapping knives 35, engage the comb frame at the ends and position the knives relative to the comb to trim only the wax cap from the cells.

As shown in the patent referred to above, the knives 35 are supported on hollow manifolds 36 which receive steam or hot water through flexible tubes 37. Heating the knives assists in separating the caps from the combs as well as the dropping of the separated caps from the knives into a suitable receptacle. As shown in FIG. 4 and in the patent mentioned above, the knives are supported for longitudinal reciprocation by pins 38 extending through bushings 39 provided in the frames 15. At one end each pin 38 and consequently its corresponding knife is urged in one direction by spring means 40. At the opposite end cam means 41 on shaft 25 engage the pins to move the pins and knives in the opposite direction. The cam means 41 are timed so that the knives move in opposite directions at any instant. After a comb is passed between the knives and the wax is skived off the cells, the comb is directed by curved guides 42 onto horizontal rails 43 of the decapper discharge conveyor 44. It will be noted that the decapped combs collect on the rails 43 and are moved by the bars 28 as the decapped combs are pushed out of the decapper device.

It has previously been pointed out that the decapper is suspended and may be moved manually from a position of registration with one extracting unit 45 to a position registering with a second extracting unit. In the embodiment of the invention shown, two extracting units 45 make up the apparatus 11. These units are substantially identical and are arranged in side-by-side relationship.

Each unit 45 has an exterior casing 46 which is preferably of cylindrical shape and disposed in horizontal position. The casing may (as shown) be of upper and lower sections 47 and 48, respectively, for convenience of manufacture and maintenance. Suitable framework 49 supports the lower sections 48, and the upper sections 47 may be removably positioned thereon. The latter sections have rectangular openings 50 and 51 in the end walls to form the loading and unloading stations 52 and 53. In the use of the apparatus the decapping device 10 is alternately registered with the loading stations 52. Suitable hook means 54 may automatically lock the decapper in the loading station until the loading operation has been completed, then the operator may trip a handle 55 to release the hook means 54.

Each casing 46 houses a spinner reel 56 which is supported for rotation on the axis of the casing by bearings 57 secured to the framework 49. Each spinner reel has a central shaft 58 journalled in the bearings 57 and provided within the casing with hubs 59. Spokes 60 radiate from the hubs and at their outer ends support honeycomb holders 61 which make up the periphery of the spinner reel. The holders 61 are made of lengths 62 of angle iron arranged in pairs spaced in predetermined relationship by traversely extending strips 63 secured to the outer sides of the angle irons. Angle iron braces 64 extend between and are welded at their ends to the angle irons 62 of adjacent sides of the holders. The spokes 60 are secured to certain of the braces 64 to complete the reel. From FIG. 5 it will be seen that the inner edges of the side flanges of each pair of angle irons 62 are bent inwardly of the holder and then slightly outwardly to provide rails 65 of hooklike cross section. These rails 65 receive the lugs 13 on the ends of the honeycombs and support the latter on the reel 56. It will be obvious that a multiplicity of combs can be assembled on each holder 61. In the form of the invention illustrated, each reel has four holders 61 disposed 90° apart around the axis of the reel. This arrangement places the holders in oppositely disposed pairs for a purpose which will be pointed out later. Pivoted locking fingers 66 may be provided for movement over the ends of rails 65 to prevent the accidental displacement of combs from the holders during the spinning operations.

As previously pointed out, the decapping device is aligned or registers with a loading opening in one of the extracting units when the honeycombs are being decapped. The rails 43 of the discharge conveyor 44 of the decapper are aligned with the rails 65 of a holder 61 and as the decapped combs are moved, either by the operation of the chains in the decapper or manually, they will slide along the rails 65 of the holder 61. When a sufficient number of the combs are in place, the reel may be revolved to locate an empty holder in registration with the loading opening and this holder can then be loaded. After all four holders are loaded, the reel is rotated or spun at the rate required to centrifuge the honey from the decapped combs. This honey impinges and collects on the inner surface of the casing and flows by gravity to a trough 67 at the bottom of the casing. Suitable receptacles are provided at the discharge ends of the troughs 67.

To effect the rotation or spinning of the reels, a drive means, designated generally at 68 in FIG. 6, has been provided. Drive means 68 may be located at the end of the extractor means opposite the decapper device 10. The drive 68 includes a motor 70 and variable speed transmission 71, the latter having an output shaft 72 with a spaced pair of pulleys 73. The motor 70 and transmission 71 are mounted for rocking movement in response to pivotal action of a lever 74 with a weight 75 at the free end. Weight 75 and lever 74 may be swung from one side of the pivotal axis of the motor and transmission mount to the other to render one or the other of pulleys 73 effective. The remaining pulley is thus rendered ineffective. Pulleys 73 alternately serve via belts 76 and 77 to drive other pulleys 78 and 79 and in turn the reels connected therewith. Brake devices 80 are provided to selectively resist and hold pulleys 78 and 79 against rotation. Each device 80 includes a shoe 81 mounted for pivotal movement into or out of engagement with the respective pulley 78 or 79. Actuating arms 82 are employed to effect the operation of the brake devices. It should be clear that through the manipulation of a selected arm 82 the respective reel can be stopped and held in the desired position for loading decapped combs and unloading combs from which the honey has been extracted. The latter combs are pushed from the reel being loaded by the decapped combs. As the empty combs are pushed from the reel, they slide onto rails 83 of a conveyor holder disposed in registration with the unloading opening 51 in the rear end wall of the casing. It is obvious that the conveyor holder may be stationarily mounted or supported for movement from one extractor unit to the other. If stationary, a conveyor holder for each extractor unit would be required. If movable, suitable means for locking the conveyor in position to receive the combs being unloaded would be desired.

The construction of the apparatus having been described above, the operation thereof may be briefly summarized as follows:

The honeycombs as taken from the hives may be placed on the automatic decapper feeder 29 by engaging the lugs 13 with spaced stretches of chain to suspend the combs therebetween. The combs are then automatically removed one at a time from the inner end of the feeder 29 and moved downwardly by the bars 28 of the decapper between the reciprocating knives 35 which cut the thin wax seal from the front and back surfaces of the comb. After the comb has passed between the knives, it is moved over the rails 43 of the decapper discharge conveyor 44 and through the loading opening of the extractor 11 with which the decapper had previously been registered. The decapped combs are slid one after the other into a holder 61 on a spinner reel 56 within the extractor casing. When sufficient combs, usually 26 to 28, have been disposed on the first holder, the brake 80 thereof will be released and the reel will turn due to the weight of the combs until the first holder is at the lower portion of the casing. Such movement will dispose the opposite holder on that reel in registration with the loading opening to receive a load of decapped combs. This operation is repeated until all four holders on the particular reel are loaded. At this time the brake 80 may be released and the lever 74 with weight 75 swung over center to tighten the belt 76 or 77 around pulley 73 and the pulley 78 or 79 secured to the shaft of the reel just loaded. This operation initiates spinning movement of the loaded reel and renders the drive to the other reel ineffective. The loaded reel will be revolved at the rate required to centrifuge the honey from the decapped combs. While such reel is being spun, the reel in the other casing can be loaded and ready for spinning when the honey has been extracted from the combs previously loaded. A substantially continuous process is thus secured.

I claim:

1. Apparatus for decapping honeycombs and extracting honey therefrom, comprising:
   a. decapping means having feeding and discharge regions;
   b. conveyor means extending between such regions to move honeycombs from the former to the latter region;
   c. means adjacent said conveyor means between said feeding and discharge regions for removing the wax caps from the cells of honeycombs moving between said regions;
   d. honey extracting means disposed adjacent the discharge region of said decapping means, said extracting means having decapped comb receiving and holding elements;
   e. means forming a part of said extracting means and supporting said comb receiving and holding elements for rotary movement;
   f. drive means connected with and rotating said supporting means at a speed sufficient to centrifuge honey from said decapped combs; and
   g. collector means surrounding said comb receiving and holding elements to collect the honey centrifuged from said combs.

2. The honeycomb decapping and honey extracting apparatus of claim 1 in which a plurality of honey extracting means are provided and said decapping means is supported for selectively registering the discharge region thereof with any one of said honey extracting means.

3. The honeycomb decapping and honey extracting apparatus of claim 1 in which the decapped comb receiving and holding elements are constructed to hold a multiplicity of honeycombs.

4. The honeycomb decapping and honey extracting apparatus of claim 1 in which the means for supporting said decapped comb receiving and holding elements is a reel-shaped member constructed to receive a plurality of groups of decapped honeycombs.

5. The honeycomb decapping and honey extracting apparatus of claim 4 in which the reel-shaped member is constructed to position said groups of honeycombs in pairs disposed diametrically opposite relative to the axis of rotation.

6. The honeycomb decapping and honey extracting apparatus of claim 2 in which the honey extracting means are disposed in side-by-side relationship and the decapping means is supported for movement from one honey extracting means to the other for loading the same.

7. The honeycomb decapping and honey extracting apparatus of claim 2 in which each honey extracting means has a cylindrical casing, a reel-shaped member supported for rotary movement in said casing and having spaced sets of guide tracks for receiving and holding the honeycombs, the drive means being operative to selectively rotate the reel-shaped members of said honey extracting means.

8. The honeycomb decapping and honey extracting apparatus of claim 7 in which the drive means is operative to vary the speed of rotation of said reel-shaped members.

9. The honeycomb decapping and honey extracting apparatus of claim 7 in which each reel-shaped member has four sets of guide tracks arranged 90° apart around the axis of rotation thereof.

10. The honeycomb decapping and honey extracting apparatus of claim 7 in which the drive means has brake means for selectively holding each reel-shaped member in a desired position of rotation.

11. The honeycomb decapping and honey extracting apparatus of claim 7 in which the reel-shaped members are disposed for rotation about horizontal axes.

12. The honeycomb decapping and honey extracting apparatus of claim 1 in which the honey extracting means has a horizontally disposed cylindrical casing with end walls; a reel member supported in said casing for rotation about the axis thereof; a plurality of sets of guide tracks on said reel member for receiving and holding the honeycombs during rotation of said reel member, said sets of guide tracks being angularly spaced about the axis of rotation of said reel member; and loading and unloading openings in the opposite end walls of said casing, the sets of guide tracks on said reel member registering with said loading and unloading openings in predetermined position of rotation of said reel member.

13. Apparatus for extracting honey from decapped honeycombs, comprising:
 a. a casing having end walls and a peripheral wall extending therebetween, the end walls having loading and unloading openings;
 b. a reel member supported in said casing for rotation about an axis extending longitudinally of said casing;
 c. sets of guide tracks extending axially of said reel member, said sets receiving and holding decapped combs and being spaced angularly about the axis of rotation of said reel member; and
 d. drive means for rotating said reel member at a speed sufficient to centrifuge honey from decapped honeycombs held thereon.

14. The honey extracting apparatus of claim 13 in which the casing is cylindrical and the axis of rotation of said reel member is substantially concentric with the casing.

15. The honey extracting apparatus of claim 14 in which the axes of the casing and reel member is substantially horizontal.

16. The honey extracting apparatus of claim 13 in which the sets of guide tracks on the reel member comprise oppositely facing angle elements with inturned flanges for receiving and holding decapped honeycombs, the reel member also having crossbars between the angle elements for reinforcement and radially extending rods to connect certain crossbars with a center rod structure.

17. The honey extracting apparatus of claim 13 in which the drive means has a motor; a variable speed transmission with an output pulley; a driven pulley connected with the reel member; and an endless belt extending around said output and driven pulleys.

18. The honey extracting apparatus of claim 17 in which the variable speed transmission is mounted for rocking movement to vary the effective distance between the axes of said output and driven pulleys; and weight means are provided to selectively bias said transmission in one direction increase the distance between said pulleys and in opposite direction to decrease such distance.

19. The honey extracting apparatus of claim 17 in which brake means are provided to reduce the speed of rotation of said reel member and secure it in predetermined positions of rotary movement.

20. The honey extracting apparatus of claim 19 in which said brake means has a shoe for engaging the driven pulley and means for moving the shoe into and out of engagement with said driven pulley.

* * * * *